(12) United States Patent
Ishikawa et al.

(10) Patent No.: US 12,547,395 B2
(45) Date of Patent: Feb. 10, 2026

(54) MOBILE TERMINAL AND SOFTWARE DISTRIBUTION SYSTEM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 18/464,523

(22) Filed: Sep. 11, 2023

(65) Prior Publication Data

US 2024/0103839 A1    Mar. 28, 2024

(30) Foreign Application Priority Data

Sep. 27, 2022 (JP) ................. 2022-153660

(51) Int. Cl.
 *G06F 8/65* (2018.01)
(52) U.S. Cl.
 CPC .................... *G06F 8/65* (2013.01)
(58) Field of Classification Search
 CPC ... G06F 8/65; G06F 8/71; H04L 67/56; H04L 67/34; H04W 4/40
 See application file for complete search history.

(56) References Cited

U.S. PATENT DOCUMENTS

| | | | |
|---|---|---|---|
| 11,023,223 B2* | 6/2021 | Ishikawa | G06F 8/65 |
| 2002/0116099 A1* | 8/2002 | Tabata | F02D 13/06 |
| | | | 903/905 |
| 2015/0309782 A1 | 10/2015 | Chen | |
| 2018/0101377 A1* | 4/2018 | Wingate, Jr. | G06F 8/654 |
| 2021/0051000 A1 | 2/2021 | Yang et al. | |
| 2021/0155252 A1 | 5/2021 | Harata et al. | |
| 2021/0165649 A1* | 6/2021 | Harata | G06F 3/0679 |
| 2021/0167988 A1* | 6/2021 | Harata | H04W 4/40 |
| 2021/0409824 A1* | 12/2021 | Kaushal | H04N 21/8173 |
| 2022/0024472 A1* | 1/2022 | Hachisuwa | G06F 8/65 |
| 2022/0156156 A1* | 5/2022 | Fazio | G06F 11/1451 |
| 2024/0201971 A1* | 6/2024 | Van Wijk | G06F 3/0644 |

FOREIGN PATENT DOCUMENTS

| | | | | |
|---|---|---|---|---|
| CN | 115202682 A | * 10/2022 | ............... | G06F 8/65 |
| JP | 2016060407 A | 4/2016 | | |
| JP | 2017149323 A | 8/2017 | | |
| JP | 2020027630 A | 2/2020 | | |

* cited by examiner

*Primary Examiner* — Daxin Wu
(74) *Attorney, Agent, or Firm* — Dickinson Wright, PLLC

(57) ABSTRACT

A mobile terminal includes: one or more memories; and one or more processors configured to receive, from a vehicle, pre-update software of a single-bank computer mounted on the vehicle; and transmit, to the vehicle, update software acquired from a server after the received pre-update software is stored in the one or more memories.

7 Claims, 9 Drawing Sheets

FIG. 2
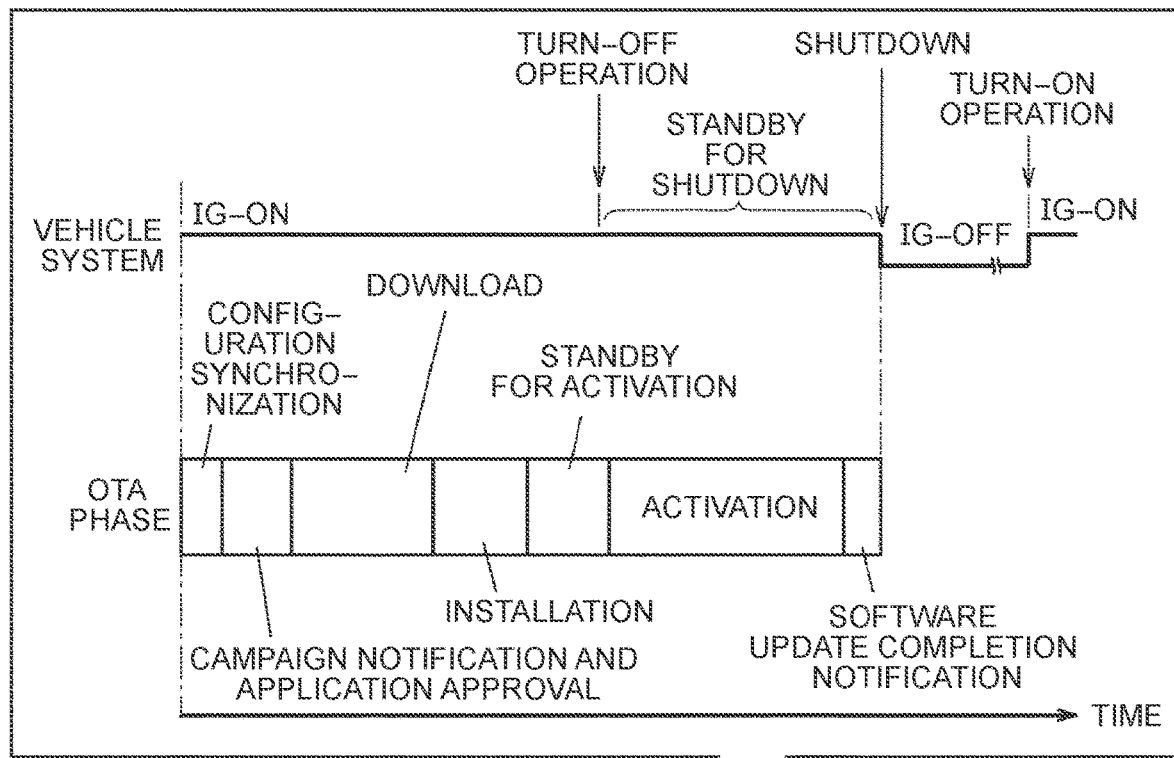
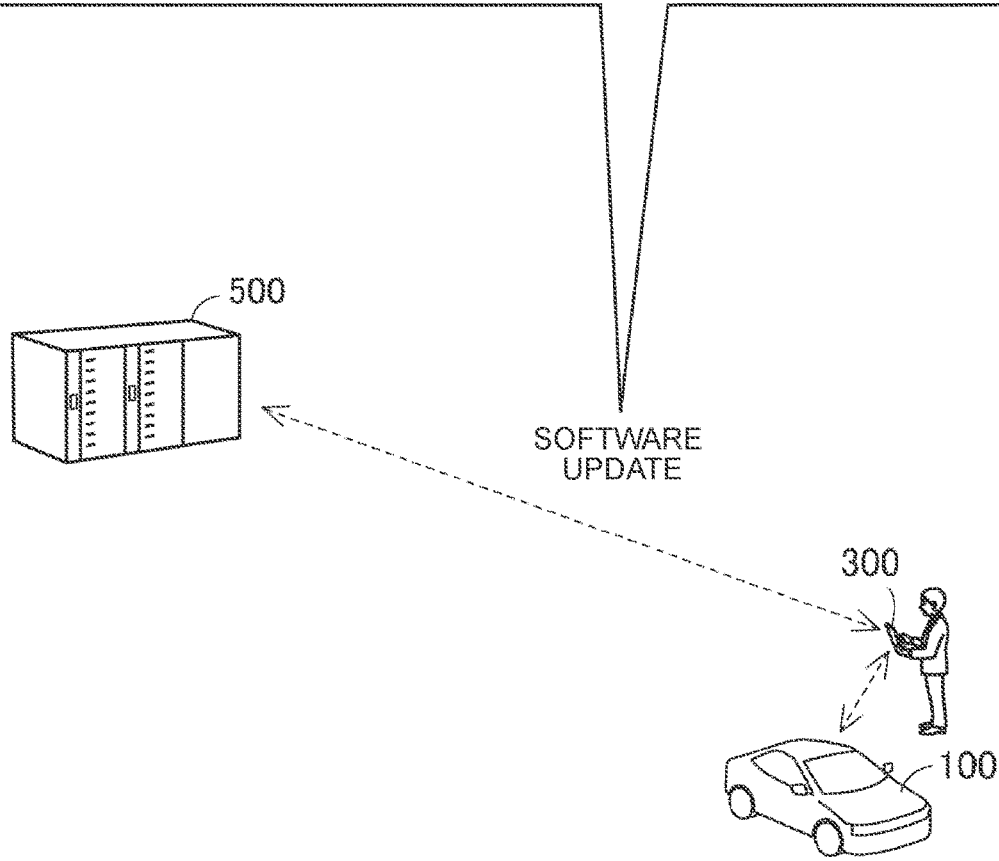

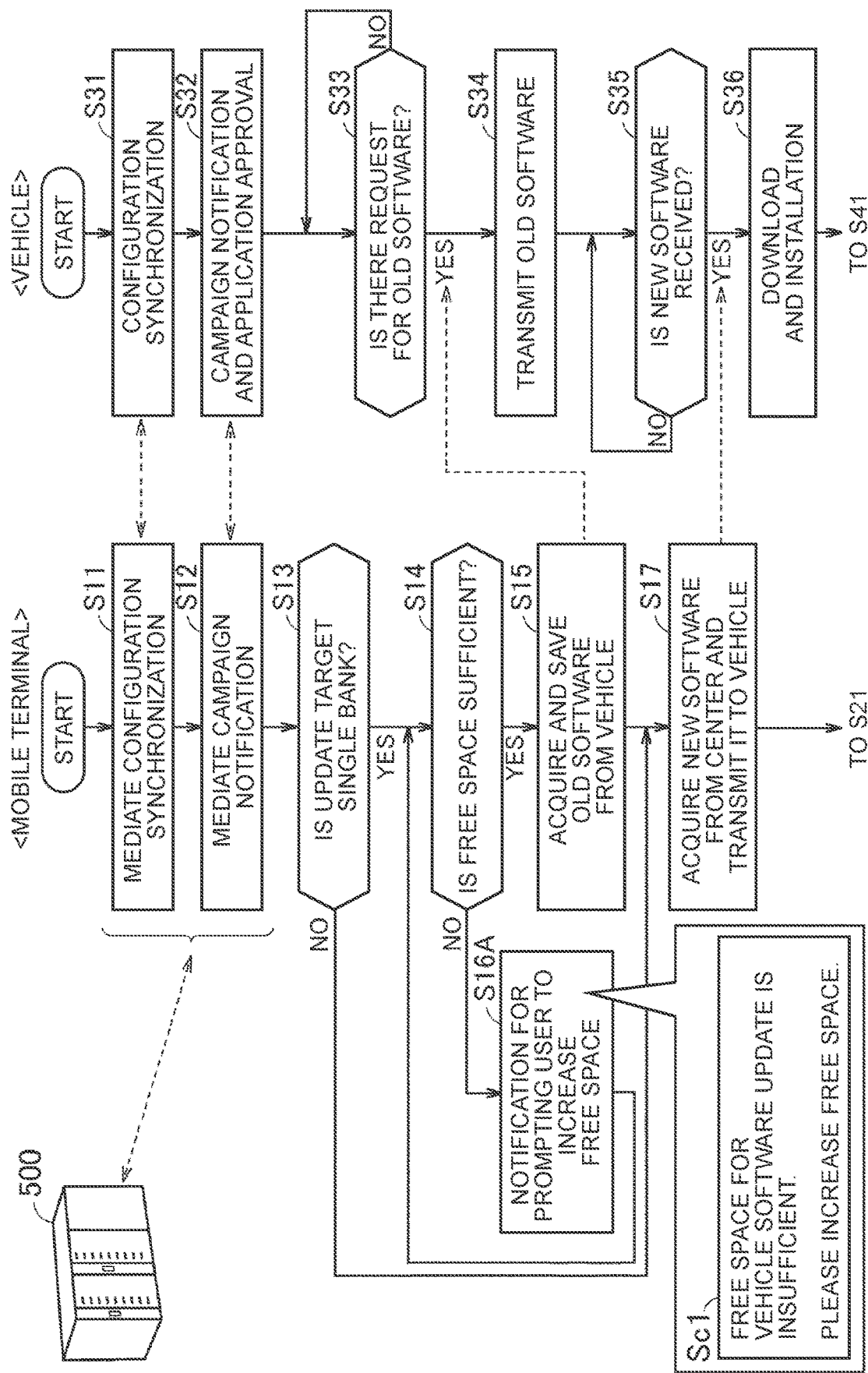

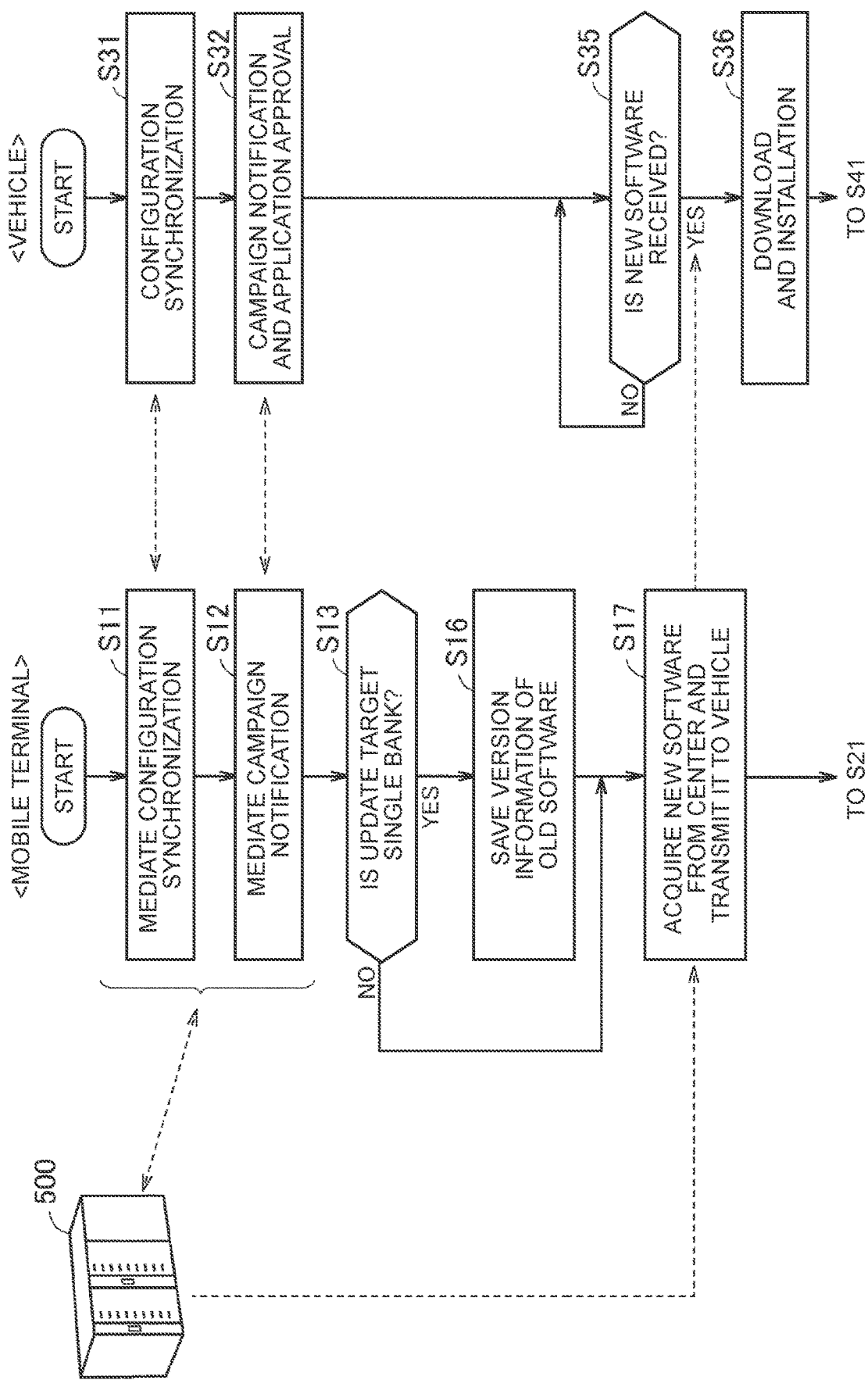

MOBILE TERMINAL AND SOFTWARE DISTRIBUTION SYSTEM

CROSS-REFERENCE TO RELATED APPLICATION

This application claims priority to Japanese Patent Application No. 2022-153660 filed on Sep. 27, 2022 incorporated herein by reference in its entirety.

BACKGROUND

1. Technical Field

The present disclosure relates to a mobile terminal and a software distribution system.

2. Description of Related Art

Japanese Unexamined Patent Application Publication No. 2017-149323 (JP 2017-149323 A) discloses a technology for updating software of an electronic control unit (ECU) mounted on a vehicle over the air (OTA).

SUMMARY

The vehicle can download new software for the on-board ECU from an OTA center by wirelessly communicating with the OTA center. In the vehicle, the software can be updated by the target ECU (ECU targeted for software update) sequentially executing installation and activation.

A typical on-board ECU includes one or more microcomputers. Typical microcomputers in the on-board ECU are roughly classified into a dual-bank microcomputer and a single-bank microcomputer.

In the dual-bank microcomputer, two banks are formed by two memories. In the dual-bank microcomputer, the software can be returned to the original version of the software (rolled back) when activation has failed. Specifically, a new version of software is written to a write bank with the original version of the software remaining on the active bank. When activation has failed on the write bank, rollback is executed by using the original version of the software remaining on the active bank.

In the single-bank microcomputer, one bank is formed by one memory. In the single-bank microcomputer, the software is overwritten in one bank. Therefore, the original version of the software does not remain. The single-bank microcomputer may have a problem that the software cannot be returned to the original version of the software (rolled back) when the activation has failed.

In view of this, the single-bank microcomputer may be changed to the dual-bank microcomputer, a storage unit for rollback may be provided in the bank of the single-bank microcomputer, or a non-volatile memory (for example, a flash memory) for rollback may be provided outside the single-bank microcomputer. However, these design changes lead to a significant increase in the cost of the on-board ECU.

Currently widely available vehicles include many single-bank microcomputers, and the software for the single-bank microcomputers is often updated at dealers. However, there is also a need to easily update the software for the single-bank microcomputers at the discretion of users of the vehicles by using the OTA technology.

The present disclosure provides a mobile terminal and a software distribution system that enable suitable software update by an OTA technology even for a single-bank computer mounted on a vehicle.

A mobile terminal according to a first aspect of the present disclosure will be described below.

Section 1

The mobile terminal includes: one or more memories; and one or more processors configured to, receive, from a vehicle, pre-update software of a single-bank computer mounted on the vehicle; and transmit, to the vehicle, update software acquired from a server after the received pre-update software is stored in the one or more memories.

The server can function as an over-the-air (OTA) center that distributes software. The mobile terminal can mediate communication between the vehicle and the OTA center. In a system including the server, the vehicle, and the mobile terminal, the single-bank computer in a target ECU (ECU targeted for software update) mounted on the vehicle can virtually function as a computer of a dual-bank computer by using the storage unit of the mobile terminal. According to the mobile terminal having the above configuration, when the vehicle has failed in the software update (for example, activation) for the single-bank computer, rollback can be executed by using the pre-update software saved in the storage unit of the mobile terminal. Thus, suitable software update can be executed by the OTA technology even for the single-bank computer mounted on the vehicle.

The mobile terminal is portable by a user. Examples of the mobile terminal include a tablet terminal, a smartphone, and a wearable device.

The mobile terminal according to section 1 may have a configuration according to any one of sections 2 to 5.

Section 2

In the above aspect, the mobile terminal wherein the one or more processors may be configured to: acquire version information of the pre-update software; determine, in software update for the single-bank computer, whether the one or more memories have a free space for saving the pre-update software; when the one or more processors determine that the one or more memories have the free space for saving the pre-update software, receive the pre-update software from the vehicle, and transmit the update software acquired from the server to the vehicle after the pre-update software is stored in the one or more memories; and when the one or more processors determine that the one or more memories do not have the free space for saving the pre-update software, acquire the version information of the pre-update software, and transmit the update software acquired from the server to the vehicle after the version information is stored in the one or more memories.

According to the mobile terminal having the above configuration, the data for the rollback (specifically, the pre-update software or its version information) can appropriately be saved depending on the free space in the storage unit (that is, the amount of data that can be stored in the storage unit).

Section 3

In the above aspect, the mobile terminal wherein the one or more processors may be configured to, in software update for the single-bank computer: keep the software update pending until a free space for saving the pre-update software is secured in the one or more memories; and permit the software update for the single-bank computer after the free space for saving the pre-update software is secured in the one or more memories.

According to the above configuration, it is easy to appropriately execute the software update for the single-bank computer.

Section 4

In the above aspect, the mobile terminal wherein: the one or more processors may be configured to issue, in the software update for the single-bank computer, a predetermined notification when the free space in the one or more memories for saving the pre-update software is insufficient.

According to the above configuration, the user can easily grasp the situation.

Section 5

In the mobile terminal of the above aspect, wherein the one or more processors may be configured to: acquire the update software from the server by wireless communication; and transmit the update software to the vehicle by wireless communication.

According to the above configuration, the convenience for the user is improved.

A mobile terminal according to a second aspect of the present disclosure will be described below.

Section 6

The mobile terminal includes: one or more memories; and one or more processors configured to, acquire version information of pre-update software of a single-bank computer mounted on a vehicle; and transmit, to the vehicle, update software acquired from a server after the version information of the pre-update software is stored in the one or more memories.

According to the mobile terminal having the above configuration, when the vehicle has failed in the software update for the single-bank computer, the mobile terminal can acquire the pre-update software from, for example, the server based on the version information of the pre-update software that is saved in the storage unit. The vehicle can receive the pre-update software from the mobile terminal and execute the rollback of the single-bank computer by using the pre-update software.

A software distribution system according to a third aspect of the present disclosure will be described below.

Section 7

The software distribution system includes: the mobile terminal according to claim 1; the vehicle; and the server, wherein the vehicle includes an electric control unit configured to manage a software update sequence, and the electric control unit is configured to: execute software update for the single-bank computer by using the update software received from the mobile terminal; and when the software update has failed, receive the pre-update software from the mobile terminal, and execute rollback by using the pre-update software.

According to the above software distribution system, the software update can easily be managed on the vehicle side.

Section 8

In the software distribution system of the above aspect, the single-bank computer may be a computer configured to control travel of the vehicle.

According to the above configuration, when the update of software related to travel control has failed, the software can be returned to the pre-update software (rolled back). With the pre-update software, the vehicle can travel as before. Therefore, the user can feel at ease.

According to the present disclosure, suitable software update can be executed by the OTA technology even for the single-bank computer mounted on the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 illustrates an overview of a software update method according to the embodiment of the present disclosure;

FIG. 8 is a flowchart showing a first modification of the process shown in FIG. 3; and FIG. 9 is a flowchart showing a second modification of the process shown in FIG. 3.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
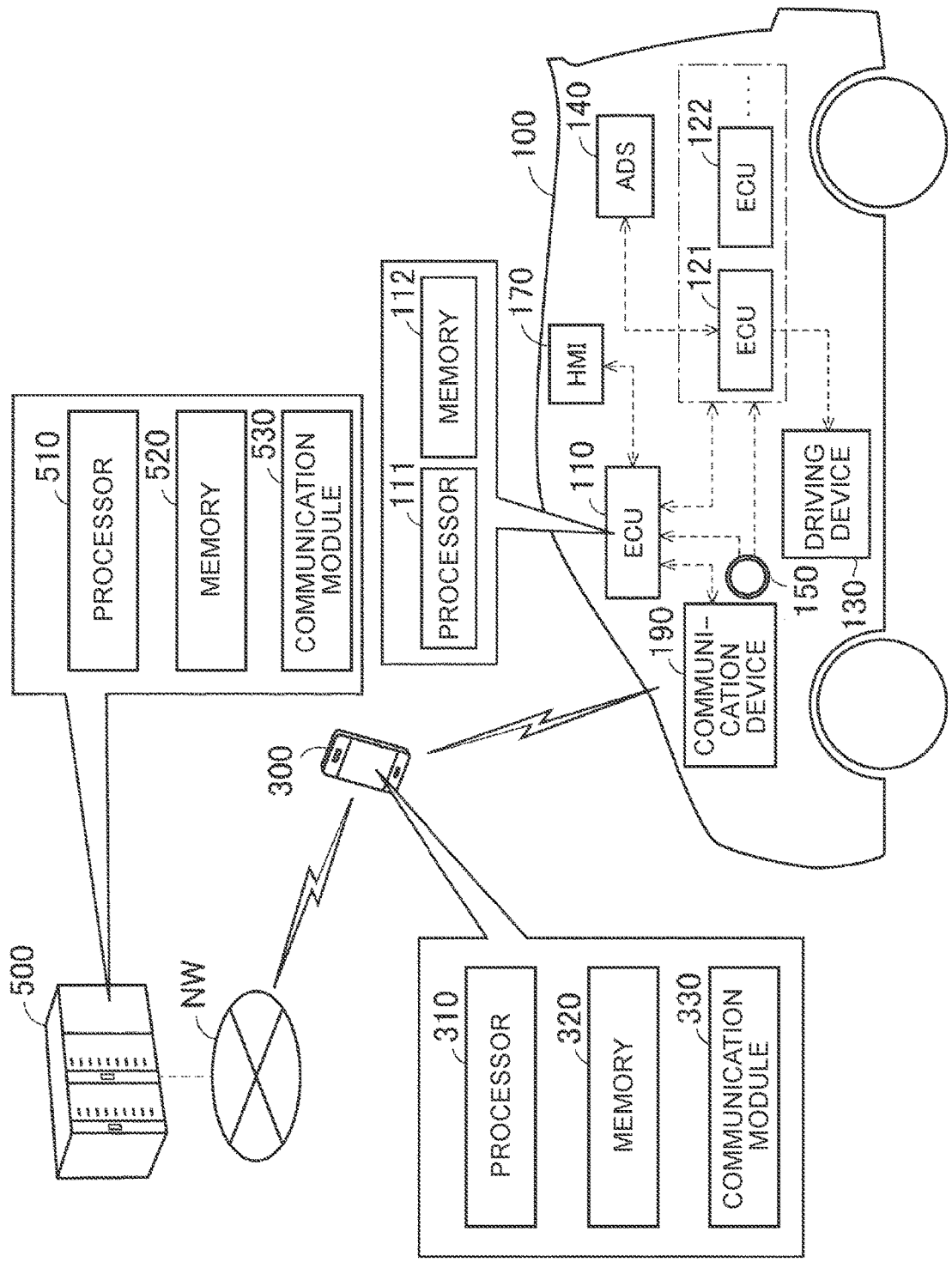
FIG. 1 shows a schematic configuration of a software distribution system according to an embodiment of the present disclosure.

FIG. 1 shows the configuration of a software distribution system according to the present embodiment. Referring to FIG. 1, the software distribution system includes a vehicle 100, a mobile terminal 300, and an OTA center 500. The "OTA" is an abbreviation for "Over The Air".

The vehicle 100 is a battery electric vehicle (BEV) that does not include an internal combustion engine. The vehicle 100 according to the present embodiment does not have an OTA access function (function for direct wireless communication with the OTA center 500), and cannot communicate with the OTA center 500 without intermediation of another communication device (that is, a communication device that is not provided in the vehicle 100). Specifically, the vehicle 100 wirelessly communicates with the OTA center 500 via the mobile terminal 300. The vehicle 100 is an example of a vehicle to which the software distribution system described below is applied, and the software distribution system may be applied to other vehicles.

The mobile terminal 300 is portable by a user. The mobile terminal 300 is carried and operated by a user of the vehicle 100 (vehicle manager). In the present embodiment, a smartphone including a touch panel display is adopted as the mobile terminal 300. The smartphone includes a computer and has a speaker function. This is not limitative, and any terminal that can be carried by the user of the vehicle 100 can be adopted as the mobile terminal 300. For example, a laptop computer, a tablet terminal, a portable gaming device, and a wearable device (such as a smartwatch, smart glasses, and smart gloves) can be adopted as the mobile terminal 300.

The mobile terminal 300 includes a processor 310, a memory 320, and a communication module 330. The processor 310 includes, for example, a central processing unit (CPU). The number of the processors is not limited to one. The number of the processors may be two or more. The memory 320 includes a non-volatile memory such as a flash memory. The number of the memories is not limited to one. The number of the memories may be two or more. The communication module 330 includes a communication interface (I/F) for direct wireless communication with the OTA center 500. The communication module 330 also includes a communication OF for direct wireless communication with the vehicle 100. The mobile terminal 300 mediates communication between the vehicle 100 and the OTA center 500. For example, the mobile terminal 300 designates an address of the OTA center 500 in response to a request from the vehicle 100 and accesses a communication network NW. Thus, the vehicle 100 (ECU 110) can communicate with the OTA center 500 via the mobile terminal 300 (communication module 330). Accordingly, wireless communication is established between the vehicle 100 and the OTA center 500.

Application software (hereinafter referred to as "mobile application") for use of a service provided by the OTA center 500 is installed in the mobile terminal 300. The mobile application is used to register identification information of the mobile terminal 300 (terminal identifier (ID)) in the OTA center 500 in association with identification information of the vehicle 100 (vehicle ID). The mobile terminal 300 can exchange information with the OTA center 500 through the mobile application.

The OTA center 500 is a server that provides a vehicle software update service using the OTA technology. The OTA center 500 is configured to execute on-board ECU software update remotely from the center via a communication section. The OTA center 500 distributes the software of the on-board ECU. The "ECU" means an electronic control unit.

The OTA center 500 includes a processor 510, a memory 520, and a communication module 530. The processor 510 includes, for example, a CPU. The memory 520 includes a non-volatile memory such as a flash memory. The communication module 530 is connected to the communication network NW by wire, and communicates with a plurality of mobile terminals (including the mobile terminal 300) via the communication network NW. The communication network NW is a wide area network constructed, for example, by the Internet and a wireless base station. The communication network NW may include a cellular telephone network.

Identification information (vehicle ID) of each vehicle (including the vehicle 100) that receives the vehicle software update service from the OTA center 500 is preregistered in the OTA center 500. A storage device (for example, the memory 520) of the OTA center 500 stores information about each vehicle (hereinafter also referred to as "vehicle information") by distinguishing the information based on the vehicle ID. The vehicle information includes, for example, specifications of each vehicle and a communication address of each vehicle (communication address of the mobile terminal 300 for the vehicle 100).

The vehicle 100 includes a plurality of ECUs (including ECUs 110, 121, 122). The vehicle 100 may include any number of ECUs. Each on-board ECU includes a computer that includes at least one processor and at least one memory. Each on-board ECU may include a plurality of microcomputers in the form of a main microcomputer, a sub-microcomputer, and the like. In the vehicle 100, the ECUs are connected to each other via a communication bus and are configured to execute wired communication. The method for communication between the ECUs is not particularly limited, and a controller area network (CAN) or Ethernet (registered trademark) may be used, for example.

The ECU 110 includes a processor 111 and a memory 112. The processor 111 includes, for example, a CPU. The memory 112 includes a non-volatile memory such as a flash memory. The vehicle 100 further includes a communication device 190. The ECU 110 communicates with devices outside the vehicle through the communication device 190. The communication device 190 includes a communication interface (I/F) for direct wireless communication with the mobile terminal 300. The communication device 190 and the mobile terminal 300 may execute short-range communication, for example, by a wireless local area network (LAN), near field communication (NFC), or Bluetooth (registered trademark). The communication device 190 may communicate directly with the mobile terminal 300 present in the vehicle or within a range around the vehicle. The mobile terminal 300 inside or outside the vehicle and the ECU 110 may exchange information with each other via the communication device 190 while the vehicle 100 is stopped. The mobile terminal 300 inside the vehicle and the ECU 110 may exchange information with each other via the communication device 190 while the vehicle 100 is traveling. As described above, the ECU 110 can communicate with the OTA center 500 via the mobile terminal 300 by requesting the mobile terminal 300 for the communication with the OTA center 500.

As described above, the ECU 110 of the vehicle 100 is configured to wirelessly communicate with the OTA center 500 via the mobile terminal 300. The vehicle 100 can communicate with the OTA center 500 while it is stopped and while it is traveling. The ECU 110 manages in-vehicle information, receives a campaign, and manages a software update sequence.

The method for communication between the vehicle 100 and the mobile terminal 300 is not limited to the short-range communication. The vehicle 100 and the mobile terminal 300 may be configured to communicate with each other even if they are remote from each other. The communication device 190 may further include a communication OF for wired communication with a scan tool (not shown) (dedicated tool for wired software update). The ECU 110 may execute wired communication via the communication device 190 with the scan tool connected to an in-vehicle data link connector (DLC) (not shown).

The vehicle 100 is an autonomous vehicle capable of autonomous driving. More specifically, the vehicle 100 is configured to execute both manned driving and unmanned driving. Although the vehicle 100 is configured to execute unmanned autonomous driving, the vehicle 100 can also be manually driven by the user (manned driving). The vehicle 100 can execute autonomous driving (for example, automatic cruise control) during the manned driving. The level of autonomous driving may be fully autonomous driving (level 5), or may be conditional autonomous driving (for example, level 4).

The vehicle 100 further includes a driving device 130 and an autonomous driving system (ADS) 140. In the vehicle 100, the ECU 121 is configured to control the driving device 130.

The driving device 130 includes an accelerator device, a brake device, and a steering device. The accelerator device includes, for example, a motor generator (hereinafter referred to as "MG") that rotates driving wheels of the vehicle, a power control unit (PCU) that drives the MG, and a battery that supplies electric power for driving the MG to the PCU. The MG functions as a motor for travel of the vehicle 100. The brake device includes, for example, a braking device provided for each of the wheels of the vehicle, and an actuator that drives the braking device. The steering device includes, for example, an electric power steering system (EPS) and an actuator that drives the EPS.

The ADS 140 includes a recognition sensor (for example, at least one of a camera, a millimeter wave radar, and a lidar) that recognizes the external environment of the vehicle, and executes a process related to autonomous driving based on information sequentially acquired by the recognition sensor. Specifically, the ADS 140 generates a travel plan (information that indicates the future behavior of the vehicle) that matches the external environment of the vehicle in cooperation with the ECU 121. Then, the ADS 140 requests the ECU 121 to control various actuators in the driving device 130 so that the vehicle 100 travels in accordance with the travel plan.

In the present embodiment, the ADS is built in the vehicle. This is not limitative, and the ADS may be an autonomous driving kit that can be removably mounted on the vehicle. A sensor unit (including the recognition sensor) of the autonomous driving kit may be attached to a rooftop of the vehicle.

The vehicle 100 further includes a start switch 150 and a human-machine interface (HMI) 170.

The start switch 150 is a switch for a user to start a vehicle system (control system for the vehicle 100), and is installed, for example, in a vehicle cabin. In general, the start switch is referred to as "power switch" or "ignition switch". When the user operates the start switch 150, the vehicle system (including each ECU mounted on the vehicle) is switched ON (activated) and OFF (deactivated). By turning ON the start switch 150, the vehicle system in the deactivated state is started and brought into the activated state (hereinafter also referred to as "IG-ON"). By turning OFF the start switch 150 when the vehicle system is activated, the vehicle system is brought into the deactivated state (hereinafter also referred to as "IG-OFF").

The operation to turn ON the start switch 150 is an operation to switch the state of the vehicle from IG-OFF to IG-ON. When the user turns ON the start switch 150, a startup request is input to each on-board ECU. That is, each on-board ECU receives the startup request from the user. The operation to turn OFF the start switch 150 is an operation to switch the state of the vehicle from IG-ON to IG-OFF. When the user turns OFF the start switch 150, a shutdown request is input to each on-board ECU, and the vehicle 100 stands by for shutdown. Thus, each on-board ECU receives the shutdown request from the user. The operation to turn OFF the start switch 150 is prohibited while the vehicle is traveling.

The HMI 170 includes an input device and a display device. The HMI 170 may include a touch panel display that functions as the input device and the display device. The HMI 170 may include an information display or a telltale as the display device. The HMI 170 may include a steering switch as the input device. At least one of an in-vehicle infotainment (IVI) system, an instrument panel, and a head-up display may function as the HMI 170. The HMI 170 may include an input device and a display device of a car navigation system.

FIG. 2 illustrates an overview of a software update method according to the present embodiment. Referring to FIG. 2 together with FIG. 1, a process related to software update (more specifically, update of vehicle software using the OTA technology) is executed in a procedure including configuration synchronization, campaign notification and application approval, download, installation, activation, and software update completion notification. The process described below is executed by the OTA center 500 and each vehicle (including the vehicle 100) that receives software distribution from the OTA center 500. The number of vehicles that receive the distribution from the OTA center 500 may be about 50, 100 or more and less than 1000, or 1000 or more.

The vehicle 100 in the IG-ON state repeats the configuration synchronization every time a preset period elapses. The vehicle 100 in the IG-ON state executes the configuration synchronization also when a configuration synchronization request is received from the OTA center 500. The process of configuration synchronization by the vehicle 100 (ECU 110) includes transmitting vehicle configuration information to the OTA center 500. The vehicle configuration information includes, for example, hardware information (information indicating product numbers of hardware, identifiers of the ECUs, etc.) and software information (information indicating product numbers of software, etc.) for the individual ECUs in the vehicle 100. In the present embodiment, the vehicle configuration information further includes RXSWIN for each target of approval. The RXSWIN is an identification number that can identify software that constitutes the functional model approval.

When the vehicle configuration information is received from the vehicle 100, the OTA center 500 checks a campaign (software update) that is currently run. When there is any campaign that is applicable to the vehicle 100, the OTA center 500 transmits an approval request signal that requests the user of the vehicle 100 about approval for download of new software (updated version of software) related to the campaign. The approval request signal includes information about the campaign (campaign information). The campaign information may include at least one of, for example, campaign attribute information (information indicating the purpose of the software update, the function of the vehicle 100 that may be affected by the update, etc.), a list of vehicles as targets for the campaign, information about ECUs as targets for the campaign (for example, software information before and after the update), and information about a notification to be sent to the user before and after the update. The campaign for the notification may be a campaign that is newly run, or may be a campaign that was not applied previously. In the following, transmission of the approval request signal will also be referred to as "campaign notification".

When the vehicle 100 receives the campaign notification (approval request signal), the vehicle 100 requests the user to input whether to approve the application of the campaign. Specifically, the vehicle 100 causes the on-board HMI (for example, the HMI 170) to display such a message "New software is found. Do you want to apply it to this vehicle?" and requests the user to input "approve" or "decline". When the user inputs "approve" on the on-board HMI, the vehicle 100 executes the following process related to download. When the user inputs "decline" on the on-board HMI, the vehicle 100 does not execute the process related to download. In this case, the OTA center 500 terminates the process related to software update without proceeding to the download phase.

In the present embodiment, the OTA center 500 and the vehicle 100 (ECU 110) execute the process related to download in a procedure described below.

The ECU 110 of the vehicle 100 requests the mobile terminal 300 for a distribution package including new software. Then, the ECU 110 downloads (receives and saves) the distribution package while executing wireless communication with the OTA center 500 via the mobile terminal 300. The distribution package may include, in addition to the new software (for example, a set of update data for each of the ECUs as targets for the campaign), package attribute information (information indicating the update section, the number of pieces of update data in the distribution package, the order of installation for the ECUs, etc.), and update data attribute information (such as an identifier of a target ECU and verification data for verifying the correctness of the update data). The target ECU is an ECU targeted for the software update. For example, the target ECU may be the ECU 121, and the software to be updated may be an autonomous driving control program.

The distribution package is saved in a storage device (for example, the memory 112) of the ECU 110 through the process related to the download described above. During the download, the on-board HMI informs the user about the progress of the download. After the completion of the download, the ECU 110 verifies the authenticity of the downloaded distribution package. When the verification result is "normal", the ECU 110 notifies the OTA center 500 about the software update status (completion of download) via the mobile terminal 300. This notification means that the download has been successful.

When the download is successful, the vehicle 100 executes installation. Specifically, the ECU 110 requests the target ECU (for example, the ECU 121) to output the state of the target ECU and a diagnostic trouble code (DTC). The ECU 110 determines whether installation is executable for each target ECU based on the state of the target ECU and the DTC. Then, the ECU 110 transfers the new software (update data) to the target ECU for which installation is executable. When the update data is received, the target ECU installs (writes into a non-volatile memory) the update data. During the installation, the on-board HMI informs the user about the progress of the installation.

When the transfer of the update data from the ECU 110 to the target ECU is completed, the target ECU transmits a transfer completion notification to the ECU 110. When the transfer completion notification is received, the ECU 110 requests the target ECU for integrity verification. When this request is received, the target ECU executes verification by using integrity verification data (verification data), and transmits the verification result to the ECU 110. The ECU 110 saves the verification result (completion, failure, or cancellation of installation) for each target ECU. When the integrity verification is completed for all the target ECUs and all the verification results are "normal", the ECU 110 notifies the OTA center 500 about the software update status (completion of installation) via the mobile terminal 300. This notification means that the installation has been successful.

When the installation is successful in succession to the download, the vehicle 100 stands by for activation. When an operation to turn OFF the start switch 150 of the vehicle 100 is performed, the ECU 110 causes the on-board HMI to display an activation approval screen to request the user to input "approve" or "decline". The activation approval screen may display restrictions on the vehicle 100 (for example, the vehicle cannot be used for a predetermined period or the operation of overcurrent devices is restricted). The activation approval screen may request the user to keep the state in which the vehicle 100 does not travel until the activation is completed (for example, the vehicle 100 stands by for shutdown, keeps a parking range locked, or operates an electric parking brake). The activation approval screen may display a message for prompting the user to check the state of the vehicle 100.

When the user inputs "approve" on the activation approval screen, the ECU 110 requests each target ECU to execute activation (enable the installed software). When the user inputs "decline" on the activation approval screen, the ECU 110 cancels the process related to software update without executing activation, and the vehicle system is shut down.

The target ECU executes activation in response to a request from the ECU 110. In a target ECU including a plurality of microcomputers (for example, a main microcomputer and a sub-microcomputer), the sub-microcomputer in the target ECU may execute rewriting by using a flash rewriting function of the main microcomputer in the target ECU. Alternatively, each microcomputer in the target ECU may directly communicate with the ECU 110 to execute rewriting.

Each target ECU notifies the ECU 110 about an activation result (success or failure). Although details will be described later, the software is rolled back when the activation has failed in the target ECU. When the activation is successful in the target ECU, the microcomputers (update target) in the target ECU are synchronously reset (self-reset) and start the updated software, for example, at a timing when all the microcomputers have been rewritten. The target ECU waits for a shutdown request from the ECU 110 after completing the self-reset. The target ECU in such a state can continue diagnosis communication with the ECU 110.

When the ECU 110 receives an activation success notification from the target ECU, the ECU 110 requests identification information of the updated software (ECU software ID) from the target ECU. The ECU 110 checks whether the identification information received from the target ECU and the identification information of the updated software in the campaign information agree with each other (configuration check). When the configuration check is successful (that is, the pieces of software identification information agree with each other), the ECU 110 updates the RXSWIN. The update of the RXSWIN means that the activation has been successful.

When the activation is successful in all the target ECUs, the ECU 110 notifies the OTA center 500 about the software update status (completion of software update) via the mobile terminal 300. This notification means that the OTA software update has been successful. The ECU 110 may cause the on-board HMI to display the result of the software update. The on-board HMI displays, for example, a software update completion screen indicating success in the update. When a notification of the software update completion is issued, the ECU 110 issues a shutdown request to each target ECU, and the control system of the vehicle 100 is shut down. Thus, the vehicle 100 is brought into the IG-OFF state. When an operation to turn ON the start switch 150 of the vehicle 100 is performed, the vehicle system is brought into the IG-ON state. Thus, the updated program (new version of software) is started in the target ECU. The software to be updated is not limited to the driving assistance control program such as the autonomous driving control program, and may be any software. For example, the OTA center 500 may distribute software related to entertainment.

Typical microcomputers in the on-board ECU are roughly classified into a dual-bank microcomputer (microcomputer of dual bank type) and a single-bank microcomputer (microcomputer of single bank type). In the dual-bank microcomputer, new software (new version of software) is written to a write bank with old software (original version of software) remaining on an active bank. When activation has failed, the software on the write bank can be returned to the old software (rolled back) by using the old software remaining on the active bank. In the single-bank microcomputer, the software is overwritten in one bank. Therefore, the old software does not remain. The single-bank microcomputer may have a problem that the software cannot be returned to the old software (rolled back) when the activation has failed.

In view of this, the software distribution system according to the present embodiment executes processes shown in FIGS. 3 and 4 described below to enable suitable software update by the OTA technology even for the single-bank computer mounted on the vehicle.

In the software distribution system according to the present embodiment, a microcomputer targeted for software update (hereinafter simply referred to as "update target") is at least one of the single-bank microcomputer and the dual-bank microcomputer in the target ECU. Although details will be described later, the ECU 121 includes the single-bank microcomputer and the ECU 122 includes the dual-bank microcomputer in the vehicle 100. When activation for the update target has failed in the target ECU, rollback of the update target is executed. In particular, a plurality of microcomputers that executes control in cooperation with each other is required to have the same software version. In these microcomputers, software version upgrade (software update) is executed simultaneously. When the activation has failed in any of these microcomputers, a process for returning the software to the old software (rollback process) is executed for all the microcomputers.

Figure 3:
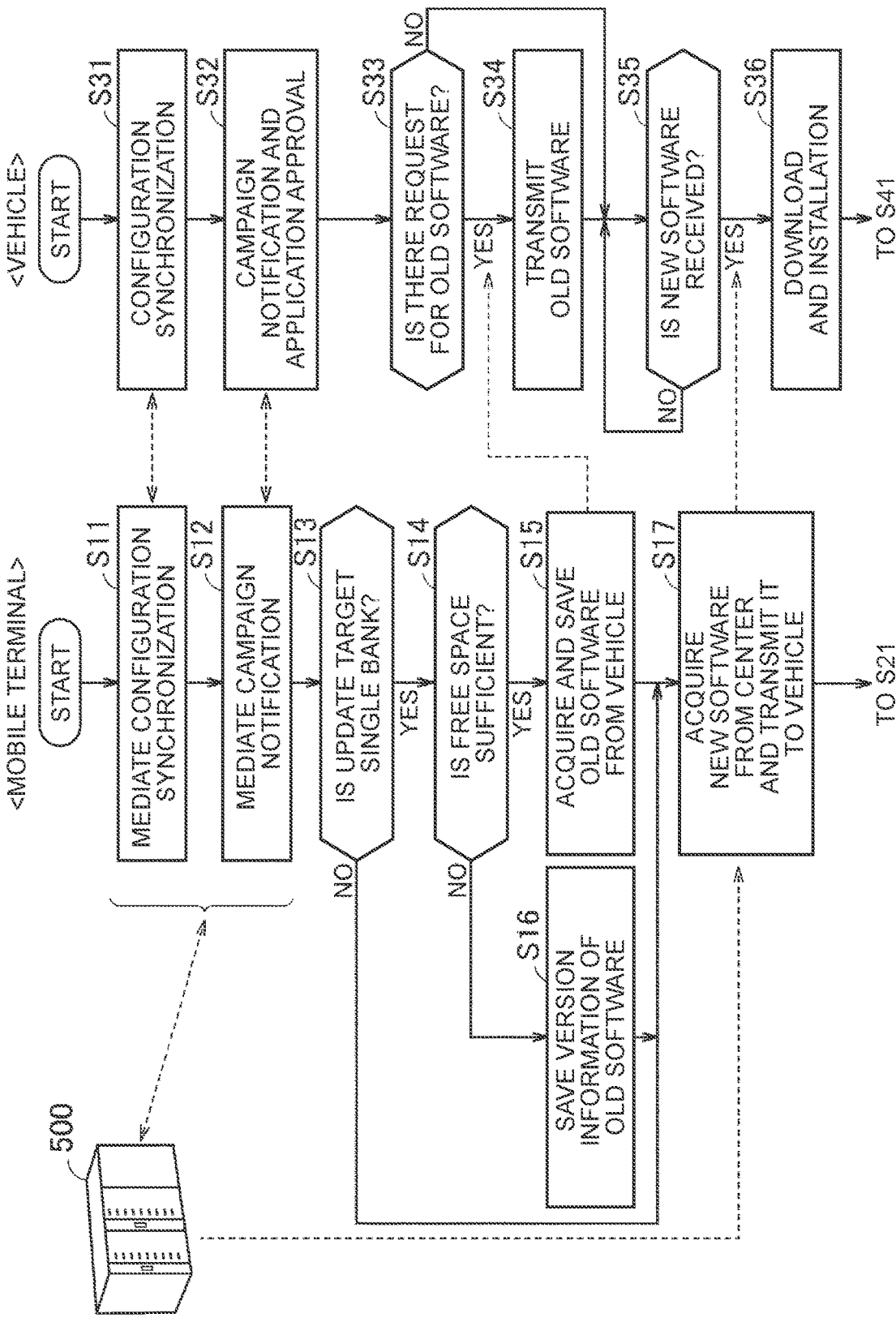
FIG. 3 is a first flowchart showing a process procedure of the software update method according to the embodiment of the present disclosure.

FIG. 3 is a first flowchart showing a process procedure of the software update method according to the present embodiment. A series of processes shown in this flowchart is executed by the mobile terminal 300 and the vehicle 100 when an execution timing of the configuration synchronization has come (for example, when an execution condition of the configuration synchronization is satisfied). In the present embodiment, the processor 310 shown in FIG. 1 functions as an example of a "reception unit", a "transmission unit", an "acquisition unit", and a "determination unit" according to the present disclosure, and the memory 320 shown in FIG. 1 functions as an example of a "storage unit" according to the present disclosure. Symbol "S" in the flowchart means a step. The following process in the flowchart is implemented by one or more processors reading and executing a program stored in one or more memories.

Referring to FIG. 3 together with FIGS. 1 and 2, a series of processes from S11 to S17 is executed by the mobile terminal 300. A series of processes from S31 to S36 is executed by the vehicle 100. In S31, the ECU 110 executes the configuration synchronization (FIG. 2) via the mobile terminal 300. In S11, the mobile terminal 300 mediates the configuration synchronization between the vehicle 100 and the OTA center 500. When there is a campaign applicable to the vehicle 100, the ECU 110 receives a campaign notification (FIG. 2) from the OTA center 500 via the mobile terminal 300 in S32. In S12, the mobile terminal 300 mediates the campaign notification from the OTA center 500 to the vehicle 100. When the user inputs "approve" on the on-board HMI about the application of the campaign, the process proceeds to S13 and S33. The series of processes shown in FIG. 3 is terminated when there is no campaign applicable to the vehicle 100 or when the user inputs "decline" about the application of the campaign. When the execution timing of the configuration synchronization has come, the series of processes shown in FIG. 3 is started again.

In S13, the mobile terminal 300 determines whether the update target (computer targeted for software update) is a single-bank microcomputer. The update target is a microcomputer in the target ECU. The mobile terminal 300 may acquire information on the update target from the vehicle 100 (ECU 110). Alternatively, the mobile terminal 300 may extract information on the update target from the campaign information (S12). When the update target is a single-bank microcomputer (YES in S13), the mobile terminal 300 checks a free space in the memory 320 in S14, and determines whether the memory 320 has a free space for saving the old software of the update target (that is, pre-update software stored in the active bank of the update target). The mobile terminal 300 may acquire a data size of the old software (main part) of the update target from the vehicle 100 (ECU 110). Alternatively, the mobile terminal 300 may extract information on the pre-update software from the campaign information (S12).

When the memory 320 has a free space for saving the old software of the update target (YES in S14), the mobile terminal 300 requests the old software (main part) of the update target from the vehicle 100 in S15. Hereinafter, this request (S15) is also referred to as "first request".

The vehicle 100 (ECU 110) waits for the first request from the mobile terminal 300 in S33 after receiving the input of "approve" from the user. Specifically, the ECU 110 determines in S33 whether the first request is received from the mobile terminal 300 within a predetermined period after the user has input "approve". When the determination is "YES" in S14, the mobile terminal 300 makes the first request for the vehicle 100 before the predetermined period elapses. Therefore, the determination is "YES" in S33. In this case, the ECU 110 transmits the old software (main part) of the update target to the mobile terminal 300 in S34. The mobile terminal 300 saves the old software (main part) received from the vehicle 100 in the memory 320. Then, the process proceeds to S17 and S35. When the determination is "NO" in S14, the predetermined period elapses without receiving the first request in the vehicle 100. Therefore, the determination is "NO" in S33. In this case, the process proceeds to S35 without executing the process of S34.

When the memory 320 does not have a free space for saving the old software of the update target (NO in S14), the mobile terminal 300 saves version information of the old software of the update target in the memory 320 in S16. The data size of the version information of the old software is much smaller than the data size of the main part of the old software. The mobile terminal 300 may acquire the version information of the old software of the update target from the vehicle 100 (ECU 110). Alternatively, the mobile terminal 300 may extract the version information of the old software of the update target from the campaign information (S12).

When the main part of the old software of the update target or the version information of the old software is saved in the memory 320 in S15 or S16, the process proceeds to S17. In S17, the mobile terminal 300 receives new software of the update target (new version of the main part of the software) from the OTA center 500 by wireless communication, and transmits the received new software to the vehicle 100 by wireless communication.

In S35, the vehicle 100 (ECU 110) determines whether the new software (S17) is received from the mobile terminal 300. When the vehicle 100 receives the new software from the mobile terminal 300 (YES in S35), the ECU 110 downloads and installs the new software (FIG. 2) in S36. Specifically, the ECU 110 downloads the new software of the update target (FIG. 2) via the mobile terminal 300. In S17, the mobile terminal 300 mediates the download from the OTA center 500 to the vehicle 100. When the download is successful, the new software is written (installed) to the update target.

When the update target includes a plurality of microcomputers (computers), the processes of S13 to S17 and S33 to S36 are executed for each update target. When the update target is a single-bank microcomputer (YES in S13), the mobile terminal 300 stores the old software of the update target or its version information in the memory 320 in S15 or S16, and then transmits the new software (update software) acquired from the OTA center 500 to the vehicle 100 in S17. When the update target is a dual-bank microcomputer (NO in S13), the process of S17 is executed without executing the processes of S14 to S16. Since the process of S15 is not executed, the determination is "NO" in S33.

Figure 4:
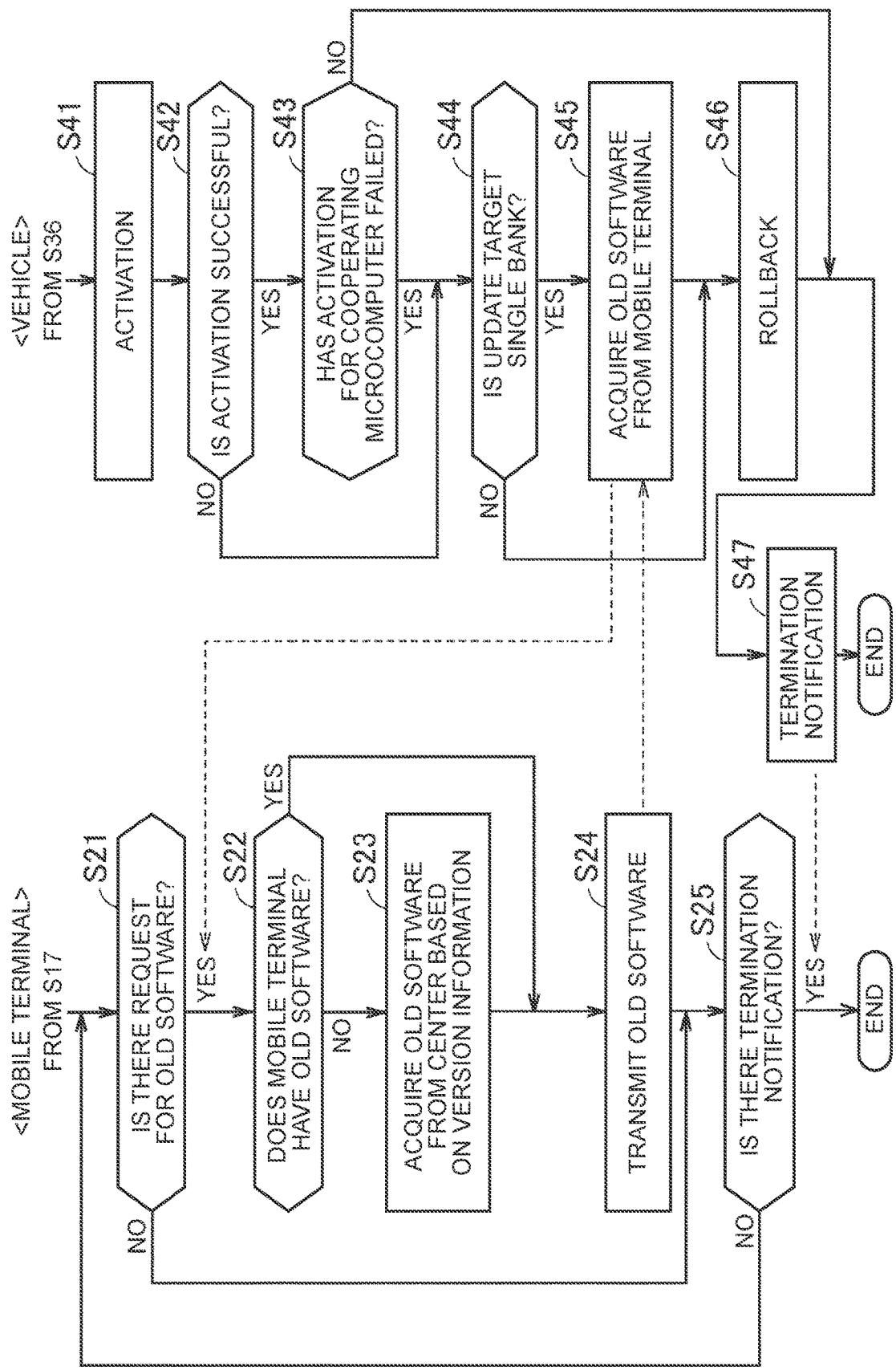
FIG. 4 is a second flowchart showing the process procedure of the software update method according to the embodiment of the present disclosure.

When a predetermined activation start condition is satisfied after the download and installation of the new software are completed for all the update targets, the process proceeds to S21 and S41 in FIG. 4. For example, when the activation start condition is satisfied, the ECU 110 requests each target ECU to execute activation. Then, a series of processes shown in FIG. 4 described below is started. FIG. 4 is a second flowchart showing the process procedure of the software update method according to the present embodiment.

Referring to FIG. 4 together with FIGS. 1 and 2, the target ECU of the vehicle 100 executes activation for the update target (FIG. 2) in S41 in response to a request from the ECU 110. For example, the ECU 110 determines whether the activation is executable in the vehicle 100. When determination is made that the activation is executable in the vehicle 100 (for example, the vehicle 100 stands by for shutdown), the ECU 110 requests the target ECU to execute the activation for the update target.

In S42, the target ECU determines whether the activation for the update target is successful. When the activation for the update target has failed (NO in S42), the target ECU notifies the ECU 110 about the activation failure. When the notification is received, the ECU 110 requests the target ECU to roll back the update target. Further, the ECU 110 requests an ECU including a microcomputer that cooperates with the update target (that is, a microcomputer that operates with the same version of software as that of the update target) to roll back the microcomputer. Then, the process proceeds to S44.

When the activation for the update target is successful (YES in S42), the target ECU further determines in S43 whether the activation for a microcomputer that cooperates with the update target has failed. The target ECU may determine whether the activation for the microcomputer that cooperates with the update target has failed based on whether the rollback request is issued from the ECU 110. When the activation for any microcomputer that cooperates with the update target has failed (YES in S43), the process proceeds to S44.

In S44, the target ECU determines whether the update target is a single-bank microcomputer. When the update target is a single-bank microcomputer (YES in S44), the vehicle 100 (target ECU) requests the mobile terminal 300 for the old software (main part) of the update target in S45. Hereinafter, this request (S45) is also referred to as "second request".

After the download described above is completed, the mobile terminal 300 waits for the second request from the vehicle 100 in S21. Specifically, the mobile terminal 300 determines in S21 whether the second request is received from the vehicle 100 within a predetermined period after the download has been completed. When the determination is "YES" in S44, the vehicle 100 makes the second request for the mobile terminal 300 before the predetermined period elapses. Thus, the determination is "YES" in S21, and the process proceeds to S22. When the determination is "NO" in S44, the predetermined period elapses without receiving the second request in the mobile terminal 300. Therefore, the determination is "NO" in S21. In this case, the process proceeds to S25 without executing the processes of S22 to S24.

In S22, the mobile terminal 300 determines whether the mobile terminal 300 has the old software (main part) of the update target. When the process of S15 in FIG. 3 has been executed, the determination is "YES" in S22, and the process proceeds to S24. In this case, the mobile terminal 300 transmits the old software (main part) of the update target that is stored in the memory 320 to the vehicle 100 (target ECU) in S24. Then, the process proceeds to S25.

When the process of S15 in FIG. 3 has not been executed (that is, when the process of S16 in FIG. 3 has been executed), the determination is "NO" in S22, and the process proceeds to S23. In S23, the mobile terminal 300 acquires the old software (main part) of the update target from the OTA center 500 based on the version information of the old software of the update target that is stored in the memory 320 (S16 in FIG. 3). In this case, the mobile terminal 300 transmits the old software (main part) of the update target that is acquired from the OTA center 500 to the vehicle 100 (target ECU) in S24. Then, the process proceeds to S25.

When the update target is a single-bank microcomputer (YES in S44), the vehicle 100 receives the old software of the update target (S24). Thus, the target ECU of the vehicle 100 executes, in S46, the update target rollback process (process for returning the software to the old software) by using the old software (main part) of the update target that is received from the mobile terminal 300. The target ECU receives the old software (main part) of the update target from the mobile terminal 300, and restores the bank (single bank) of the update target to the state before the update by using the received old software (main part).

When the update target is a dual-bank microcomputer (NO in S44), the vehicle 100 does not receive the old software of the update target (S24) from the mobile terminal 300, and the target ECU of vehicle 100 executes the rollback process for the update target in S46.

Figure 5:
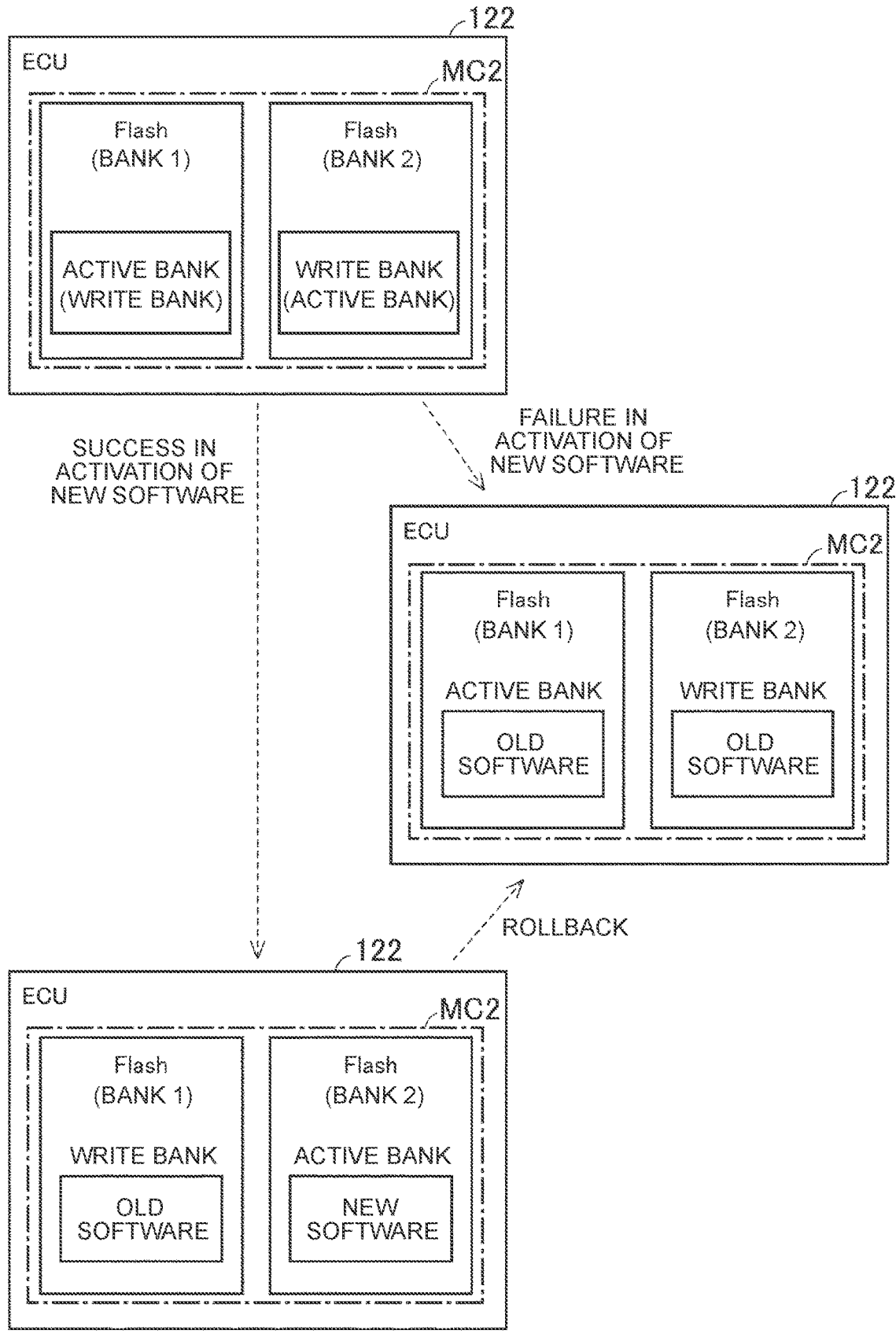
FIG. 5 illustrates an activation (rollback) process for a dual-bank microcomputer of a target ECU among processes shown in FIG. 4.

FIG. 5 illustrates an activation (rollback) process for the dual-bank microcomputer of the ECU 122. Description will be given of an example in which the ECU 122 is the target ECU and a dual-bank microcomputer MC2 is the update target.

Referring to FIG. 5, the ECU 122 includes the dual-bank microcomputer MC2 including two banks (first bank and second bank). Specifically, the dual-bank microcomputer MC2 includes two memories (for example, flash memories), and each memory forms a bank in the microcomputer. For example, when the first bank is an active bank, the second bank is a write bank. The active bank (first bank) stores old software. New software is written to the write bank (second bank) by the download process and the installation process described above (S36 in FIG. 3). Then, the ECU 122 (target ECU) switches the write bank of the dual-bank microcomputer MC2 to the active bank (activation) in S41 of FIG. 4.

When the ECU 122 successfully executes the activation for the dual-bank microcomputer MC2 and does not receive a rollback request from the ECU 110, the ECU 122 waits for a shutdown request from the ECU 110 after self-reset. In this case, the first bank storing the old software serves as the write bank and the second bank to which the new software has been written serves as the active bank. That is, the dual-bank microcomputer MC2 is started with the new software (updated program). When the ECU 122 receives the rollback request from the ECU 110, the ECU 122 executes the rollback process for the dual-bank microcomputer MC2 (S46 in FIG. 4). In this case, the first bank storing the old software returns to the active bank and the second bank serves as the write bank. The old software is written to the write bank. Then, the dual-bank microcomputer MC2 is started with the old software (pre-update program).

Figure 6:
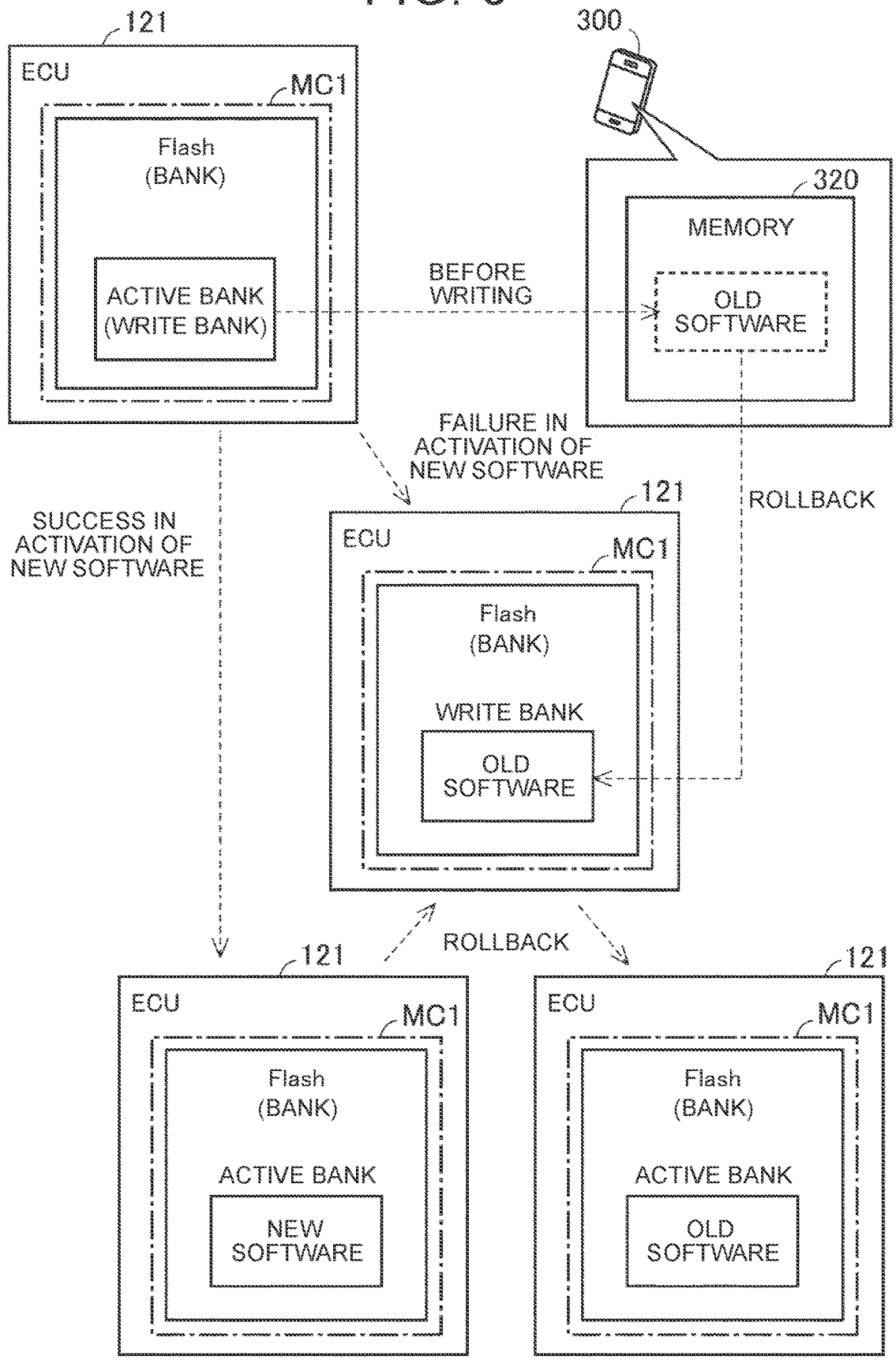
FIG. 6 illustrates a first example of an activation (rollback) process for a single-bank microcomputer of a target ECU among the processes shown in FIG. 4.

FIG. 6 illustrates a first example of an activation (rollback) process for the single-bank microcomputer of the ECU 121. Description will be given of an example in which the ECU 121 is the target ECU and a single-bank microcomputer MC1 is the update target. In this example, the memory 320 has a free space for saving the pre-update software (main part) of the single-bank microcomputer MC1 at the time of download.

Referring to FIG. 6, the ECU 121 includes the single-bank microcomputer MC1 including one bank (single bank). Specifically, the single-bank microcomputer MC1 includes one memory (for example, flash memory), and the memory forms a bank in the microcomputer. The single-bank microcomputer MC1 corresponds to a computer that controls travel of the vehicle 100. For example, the bank is an active bank during normal operation. Before the software update, the bank stores old software. The bank serves as a write bank during the software update. New software is written to the bank by the download process and the installation process described above (S36 in FIG. 3). Before the writing, the old software (pre-update software) is saved in the memory 320 of the mobile terminal 300 (S15 in FIG. 3).

Then, the ECU 121 (target ECU) switches the write bank of the single-bank microcomputer MC1 to the active bank (activation) in S41 of FIG. 4. When the ECU 121 successfully executes the activation for the single-bank microcomputer MC1 and does not receive a rollback request from the ECU 110, the ECU 121 waits for a shutdown request from the ECU 110 after self-reset. In this case, the bank to which the new software has been written serves as the active bank. That is, the single-bank microcomputer MC1 is started with the new software (updated program). When the ECU 121 receives the rollback request from the ECU 110, the ECU 121 executes the rollback process for the single-bank microcomputer MC1 (S44 to S46 in FIG. 4). Specifically, the ECU 121 receives the old software (main part) from the mobile terminal 300 (memory 320) and writes the old software to the bank of the single-bank microcomputer MC1. Then, the bank to which the old software has been written serves as the active bank. In this case, the single-bank microcomputer MC1 is started with the old software (pre-update program).

Figure 7:
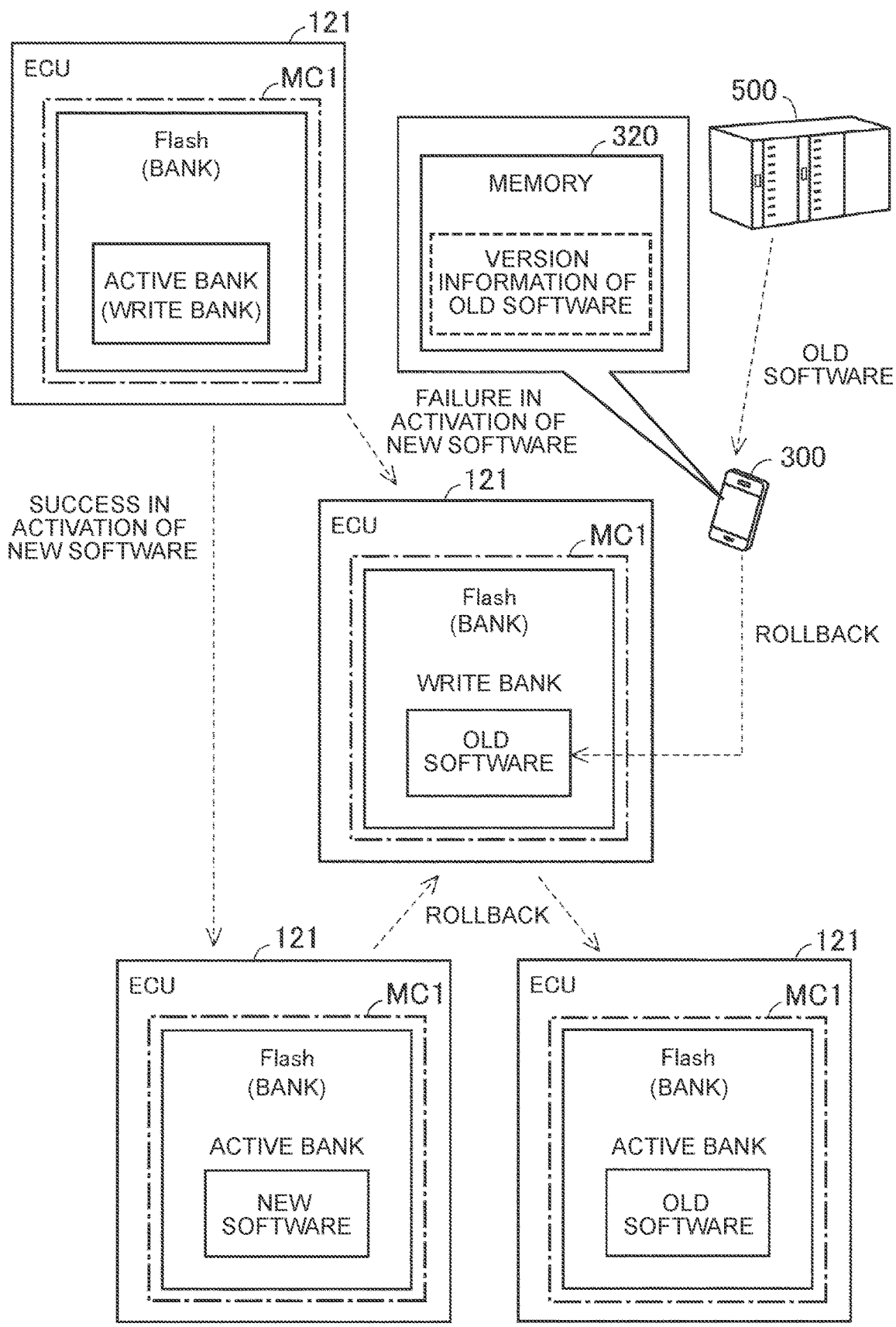
FIG. 7 illustrates a second example of the activation (rollback) process for the single-bank microcomputer of the target ECU among the processes shown in FIG. 4.

FIG. 7 illustrates a second example of the activation (rollback) process for the single-bank microcomputer of the ECU 121. Description will be given of an example in which the ECU 121 is the target ECU and the single-bank microcomputer MC1 is the update target. In this example, the memory 320 does not have a free space for saving the pre-update software (main part) of the single-bank microcomputer MC1 at the time of download.

Referring to FIG. 7, also in this example, the bank of the single-bank microcomputer MC1 serves as the write bank during the software update, and new software is written to the bank by the download process and the installation process described above (S36 in FIG. 3). In this example, version information of the old software is saved in the memory 320 of the mobile terminal 300 before the writing (S16 in FIG. 3) instead of the main part of the old software.

Then, the ECU 121 (target ECU) switches the write bank of the single-bank microcomputer MC1 to the active bank (activation) in S41 of FIG. 4. When the ECU 121 successfully executes the activation for the single-bank microcomputer MC1 and does not receive a rollback request from the ECU 110, the ECU 121 waits for a shutdown request from the ECU 110 after self-reset. In this case, the bank to which the new software has been written serves as the active bank. That is, the single-bank microcomputer MC1 is started with the new software (updated program). When the ECU 121 receives the rollback request from the ECU 110, the ECU 121 executes the rollback process for the single-bank microcomputer MC1 (S44 to S46 in FIG. 4). Specifically, the ECU 121 requests the old software from the mobile terminal 300 (S45 in FIG. 4). In response to a request from the ECU 121, the mobile terminal 300 acquires, from the OTA center 500, the software (main part) of the version indicated by the version information stored in the memory 320, and transmits the acquired software (main part) to the vehicle 100 (ECU 121). The ECU 121 receives the old software (main part) from the mobile terminal 300 and writes the old software to the bank of the single-bank microcomputer MC1. Then, the bank to which the old software has been written serves as the active bank. In this case, the single-bank microcomputer MC1 is started with the old software (pre-update program).

Referring again to FIG. 4 together with FIGS. 1 and 2, the target ECU executes the update target rollback process in S46 as described above. When the activation for the update target has failed due to any trouble during the activation, the target ECU may return the update target to a normal state by using a pre-update journal file (file to which log information is written). When the requested rollback is completed, the target ECU notifies the ECU 110 about the completion of the rollback. When the ECU 110 receives the rollback completion notification, the ECU 110 requests identification information of the pre-update software (ECU software ID) from the target ECU. The ECU 110 checks whether the identification information received from the target ECU and the identification information of the pre-update software in the campaign information agree with each other (configuration check). Successful configuration check (that is, agreement between the pieces of software identification information) means that the rollback has been successful. When the pieces of software identification information do not agree with each other, the ECU 110 may request the target ECU to execute the rollback again.

When the rollback is successful, the process proceeds to S47. When the activation for the update target is successful (YES in S42) and the activation has not failed in any of the microcomputers that cooperate with the update target (NO in S43), the process proceeds to S47. When the update target includes a plurality of microcomputers (computers), the processes of S41 to S46 and S21 to S24 are executed for each update target. When the activation or rollback is successful for all the update targets, the vehicle 100 (ECU 110) notifies the mobile terminal 300 about the completion in S47. When the process of S47 is executed, the series of processes of S31 to S47 by the vehicle 100 is terminated.

In S25, the mobile terminal 300 determines whether the termination notification (S47) has been received from the vehicle 100. When the mobile terminal 300 has not received the termination notification (NO in S25), the process returns to S21. When the mobile terminal 300 has received the termination notification (YES in S25), the series of processes of S11 to S25 by the mobile terminal 300 is terminated.

As described above, the software distribution system according to the present embodiment includes the mobile terminal 300, the vehicle 100, and the OTA center 500 (server). The mobile terminal 300 includes the processor 310 and the memory 320 (storage unit). The processor 310 is configured to receive, from the vehicle 100, the pre-update software of the single-bank computer mounted on the vehicle 100 (S15 in FIG. 3), and to store the received pre-update software in the memory 320 (S15 in FIG. 3) and then transmit, to the vehicle 100, the update software acquired from the OTA center 500 (S17 in FIG. 3).

According to the mobile terminal 300 having the above configuration, when the vehicle 100 has failed in the software update (for example, activation) for the single-bank computer (for example, the single-bank microcomputer MC1 shown in FIG. 6), the rollback can be executed by using the pre-update software saved in the memory 320 of the mobile terminal 300. Thus, suitable software update can be executed by the OTA technology even for the single-bank computer as well as the dual-bank computer mounted on the vehicle 100.

The processor 310 of the mobile terminal 300 is configured to acquire the version information of the pre-update software (S16 in FIG. 3), and to determine whether the memory 320 (storage unit) has a free space for saving the pre-update software in the software update of the single-bank computer (S14 in FIG. 3). When determination is made that the memory 320 has a free space for saving the pre-update software (YES in S14 of FIG. 3), the processor 310 receives the pre-update software from the vehicle 100 (S15 in FIG. 3), stores the pre-update software in the memory 320 (S15 in FIG. 3), and then transmits, to the vehicle 100, the update software acquired from the OTA center 500 (S17 in FIG. 3). When determination is made that the memory 320 does not have a free space for saving the pre-update software (NO in S14 of FIG. 3), the processor 310 acquires the version information of the pre-update software (S16 in FIG. 3), stores the version information in the memory 320 (S16 in FIG. 3), and then transmits, to the vehicle 100, the update software acquired from the OTA center 500 (S17 in FIG. 3).

According to the mobile terminal 300 having the above configuration, the data for the rollback (specifically, the pre-update software or its version information) can appropriately be saved depending on the free space in the memory 320. When the free space in the memory 320 is sufficiently large, the pre-update software is saved in the memory 320 in advance, thereby enabling early execution of the rollback.

The vehicle 100 according to the present embodiment includes the ECU 110 (control device) configured to manage the software update sequence. The ECU 110 is configured to execute the software update for the single-bank computer by using the update software received from the mobile terminal 300 (S36 in FIGS. 3 and S41 in FIG. 4). The ECU 110 is configured to, when the software update has failed, receive the pre-update software from the mobile terminal 300 and execute the rollback by using the pre-update software (S44 to S46 in FIG. 4). According to the vehicle 100 having such a configuration, the software update can easily be managed on the vehicle side.

The processes shown in FIGS. 3 and 4 can be changed as appropriate. For example, in the above embodiment, determination is made in S13 (FIG. 3) and S44 (FIG. 4) whether the update target is the single-bank microcomputer. Some vehicles may include an ECU including a single-bank microcomputer with a storage unit for rollback. In a system for distributing software to such vehicles, determination may be made in S13 (FIG. 3) and S44 (FIG. 4) whether the update target is a single-bank microcomputer that does not have the storage unit for rollback. That is, when the update target is the single-bank microcomputer but has the storage unit for rollback, the determination may be "NO" in each of S13 (FIG. 3) and S44 (FIG. 4). Examples of the single-bank microcomputer with the storage unit for rollback include a single-bank microcomputer with a storage unit for rollback in the bank, and a single-bank microcomputer with an external storage unit (non-volatile memory) for rollback. Such a single-bank microcomputer can perform rollback in a manner similar to that of the dual-bank microcomputer.

FIG. 8 is a flowchart showing a first modification of the process shown in FIG. 3. In the present modification, the processor 310 shown in FIG. 1 functions as an example of the "reception unit", the "transmission unit", an "update unit", and a "notification unit" according to the present disclosure, and the memory 320 shown in FIG. 1 functions as an example of the "storage unit" according to the present disclosure.

Referring to FIG. 8 together with FIGS. 1 and 2, in the present modification, the process does not proceed when the determination is "NO" in S33, and the determination of S33 is repeated while the determination is "NO" in S33. Further, S16A is adopted in place of S16 (FIG. 3). When the memory 320 does not have a free space for saving the old software (main part) of the update target (NO in S14), the mobile terminal 300 issues a predetermined notification in S16A. Specifically, the mobile terminal 300 displays, for example, a screen Sc1. The screen Sc1 displays a message for prompting the user to increase the free space in the memory 320. The user can increase the free space in the memory 320 by operating the mobile terminal 300 to stop unnecessary applications running on the mobile terminal 300 or delete unnecessary data stored in the memory 320. While the free space in the memory 320 for saving the old software (main part) is insufficient (NO in S14), S14 and S16A are repeated and the mobile terminal 300 keeps displaying the screen Sc1 (S16A). When the user has increased the free space in the memory 320 until the free space becomes sufficient in response to the request on the screen Sc1 (YES in S14), the mobile terminal 300 requests the old software (main part) of the update target from the vehicle 100 (first request) in S15. Thus, the determination is "YES" in S33, and the vehicle 100 (ECU 110) transmits the old software (main part) of the update target to the mobile terminal 300 in S34.

In the above first modification, in the software update for the single-bank computer, the mobile terminal 300 repeats the processes of S14 and S16A until the processor 310 of the mobile terminal 300 secures the free space for saving the pre-update software in the memory 320 (storage unit) (NO in S14). Therefore, S33 is repeated on the vehicle 100 side. Thus, the software update is pending. After the free space for saving the pre-update software is secured in the memory 320 (YES in S14), the mobile terminal 300 permits the software update for the single-bank computer by the first request (S15). Thus, the process on the vehicle 100 side proceeds to S34 and the software update for the single-bank computer is executed. The processes described above reduce the occurrence of a case where the software update proceeds in a situation in which the rollback cannot be executed. The processor 310 is configured to issue the predetermined notification (S16A) when the free space in the memory 320 (storage unit) for saving the pre-update software is insufficient (NO in S14) in the software update for the single-bank computer. By such a notification process, the user can easily grasp the situation.

In the above first modification, the determination is always "YES" in S22 of FIG. 4. Therefore, S22 and S23 of FIG. 4 may be omitted and the process may proceed to S24 when the determination is "YES" in S21.

FIG. 9 is a flowchart showing a second modification of the process shown in FIG. 3. In the present modification, the processor 310 shown in FIG. 1 functions as an example of the "transmission unit" and the "acquisition unit" according to the present disclosure, and the memory 320 shown in FIG. 1 functions as an example of the "storage unit" according to the present disclosure.

Referring to FIG. 9 together with FIGS. 1 and 2, S14, S15, S33, and S34 (FIG. 3) are absent in the present modification. When the determination is "YES" in S13, the mobile terminal 300 saves only the version information of the old software of the update target in the memory 320 in S16. The mobile terminal 300 may acquire the version information of the old software of the update target from the vehicle 100. Alternatively, the mobile terminal 300 may extract the version information of the old software of the update target from the campaign information (S12). When the version information of the old software of the update target is saved in the memory 320 by the process of S16, the process proceeds to S17.

In the software distribution system according to the second modification, the mobile terminal 300 includes the processor 310 and the memory 320 (storage unit). The processor 310 is configured to acquire the version information of the pre-update software of the single-bank computer mounted on the vehicle 100 (S16), and to store the version information in the memory 320 (S16) and then transmit, to the vehicle 100, the update software acquired from the OTA center 500 (server) (S17).

According to the mobile terminal 300 having the above configuration, when the vehicle 100 has failed in the software update for the single-bank computer, the mobile terminal 300 can acquire the pre-update software from the OTA center 500 based on the version information of the pre-update software that is saved in the memory 320 in advance. The vehicle 100 can receive the pre-update software from the mobile terminal 300 and execute the rollback of the single-bank computer by using the pre-update software. In the above second modification, the determination is always "NO" in S22 of FIG. 4. Therefore, S22 of FIG. 4 may be omitted and the process may proceed to S23 when the determination is "YES" in S21.

The reception unit, the transmission unit, the acquisition unit, the determination unit, the update unit, and the notification unit of the mobile terminal 300 may be implemented not by software but by dedicated hardware (electronic circuit). In the above embodiment, an on-premises server is adopted as the OTA center 500 (see FIG. 1). This is not limitative, and the functions of the OTA center 500 (for example, a function related to software distribution) may be implemented on a cloud through cloud computing. That is, the OTA center 500 may be a cloud server.

The vehicle may include an OTA master having an OTA access function. The vehicle may include a telematics control unit (TCU) and/or a data communication module (DCM) that executes wireless communication with the OTA center. It is not necessary that the vehicle be configured to execute the autonomous driving. The vehicle may be an xEV (electrified vehicle) other than the BEV. The vehicle may include an internal combustion engine (for example, a gasoline engine, a biofuel engine, or a hydrogen engine). The vehicle is not limited to a four-wheeled passenger vehicle, and may be a bus or a truck, or may be a three-wheeled xEV. The vehicle may have a flight function. The vehicle may be a Mobility-as-a-Service (MaaS) vehicle. The vehicle may be a multi-purpose vehicle to be customized depending on the purpose of use of the user. The vehicle may be a mobile-shop vehicle, a robot taxi, an automated guided vehicle (AGV), or an agricultural machine. The vehicle may be a small-sized unmanned or single-seater BEV (for example, a last-mile BEV, an electric wheelchair, or an electric skater).

The above various modifications may be implemented in any combination.

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

What is claimed is:

1. A mobile terminal comprising:
one or more memories; and
one or more processors configured to,
receive, from a vehicle, pre-update software of a single-bank computer mounted on the vehicle; and
transmit, to the vehicle, update software acquired from a server after the received pre-update software is stored in the one or more memories;
wherein the one or more processors are configured to, in software update for the single-bank computer:
keep the software update pending until a free space for saving the pre-update software is secured in the one or more memories; and
permit the software update for the single-bank computer after the free space for saving the pre-update software is secured in the one or more memories.

2. The mobile terminal according to claim 1, wherein the one or more processors are configured to:
acquire version information of the pre-update software;
determine, in software update for the single-bank computer, whether the one or more memories have a free space for saving the pre-update software;
when the one or more processors determine that the one or more memories have the free space for saving the pre-update software, receive the pre-update software from the vehicle, and transmit the update software acquired from the server to the vehicle after the pre-update software is stored in the one or more memories; and
when the one or more processors determine that the one or more memories do not have the free space for saving the pre-update software, acquire the version information of the pre-update software, and transmit the update software acquired from the server to the vehicle after the version information is stored in the one or more memories.

3. The mobile terminal according to claim 1, wherein the one or more processors are configured to issue, in the software update for the single-bank computer, a predetermined notification when the free space in the one or more memories for saving the pre-update software is insufficient.

4. The mobile terminal according to claim 1, wherein the one or more processors are configured to:

acquire the update software from the server by wireless communication; and transmit the update software to the vehicle by wireless communication.

5. A software distribution system comprising:
the mobile terminal according to claim 1;
the vehicle; and
the server, wherein
the vehicle includes an electric control unit configured to manage a software update sequence, and
the electric control unit is configured to:
    execute software update for the single-bank computer by using the update software received from the mobile terminal; and
    when the software update has failed,
        receive the pre-update software from the mobile terminal, and
        execute rollback by using the pre-update software.

6. The software distribution system according to claim 5, wherein the single-bank computer is a computer configured to control travel of the vehicle.

7. A mobile terminal comprising:

one or more memories; and one or more processors configured to,
    acquire version information of pre-update software of a single-bank computer mounted on a vehicle; and
    transmit, to the vehicle, update software acquired from a server after the version information of the pre-update software is stored in the one or more memories;

wherein the one or more processors are configured to, in software update for the single-bank computer:
    keep the software update pending until a free space for saving the pre-update software is secured in the one or more memories; and
    permit the software update for the single-bank computer after the free space for saving the pre-update software is secured in the one or more memories.

* * * * *